United States Patent [19]

Bollaert et al.

[11] Patent Number: 5,536,038
[45] Date of Patent: Jul. 16, 1996

[54] SIDE IMPACT INFLATABLE RESTRAINT WITH VENT OPENINGS

[75] Inventors: Matthew C. Bollaert, Capac; Louis R. Brown, Oxford; Edward J. Burley, Romeo, all of Mich.

[73] Assignee: TRW Vehicle Safety Systems Inc., Lyndhurst, Ohio

[21] Appl. No.: 382,073

[22] Filed: Feb. 1, 1995

[51] Int. Cl.$^6$ .......................... B60R 21/22; B60R 21/28
[52] U.S. Cl. ................... 280/730.2; 280/739; 280/743.1
[58] Field of Search ................. 280/739, 730.2, 280/743.1, 728.1, 730.1, 731, 732, 738

[56] References Cited

U.S. PATENT DOCUMENTS

| | | | |
|---|---|---|---|
| 4,805,930 | 2/1989 | Takada | 280/739 |
| 5,071,161 | 12/1991 | Mahon et al. | 280/739 |
| 5,094,476 | 3/1992 | Chihaya | 280/743.1 |
| 5,114,180 | 5/1992 | Kami et al. | 280/739 |
| 5,186,488 | 2/1993 | Takano | 280/728.1 |
| 5,205,583 | 4/1993 | Henseler et al. | 280/743.1 |
| 5,251,931 | 10/1993 | Semchena et al. | 280/730.1 |
| 5,273,309 | 12/1993 | Lau et al. | 280/730.2 |
| 5,316,336 | 5/1994 | Taguchi et al. | 280/730.2 |

FOREIGN PATENT DOCUMENTS

| | | | |
|---|---|---|---|
| 3-281455 | 12/1991 | Japan | 280/730.2 |
| 5-238346 | 9/1993 | Japan | 280/730.2 |
| 6-286568 | 10/1994 | Japan | 280/739 |

*Primary Examiner*—Eric D. Culbreth
*Assistant Examiner*—Peter C. English
*Attorney, Agent, or Firm*—Tarolli, Sundheim, Covell, Tummino & Szabo

[57] ABSTRACT

An inflatable vehicle occupant restraint (12) includes a first fabric panel (60), a second fabric panel (62), and a seam (64) at which the fabric panels (60,62) are fastened to each other. The restraint (12) further includes a vent opening (128) which interrupts the seam (64) to direct inflation fluid to exit the restraint (12) between the fabric panels (60,62). The restraint (12) is inflated between a vehicle seat (16) and an adjacent vehicle door (18) upon the occurrence of a side impact collision, and protects an occupant of the seat (16) from being forcefully struck by the door (18). The vent opening (128) directs the inflation fluid to exit the restraint (12) in a direction which is perpendicular to the direction in which the door (18) is moved toward the seat (16) by the side impact collision. As a result, the flow of inflation fluid which is directed from the restraint (12) through the vent opening (128) is directed away from the occupant and is not blocked or impeded substantially by the seat (16) or the door (18).

10 Claims, 7 Drawing Sheets

SIDE IMPACT INFLATABLE RESTRAINT WITH VENT OPENINGS

FIELD OF THE INVENTION

The present invention relates to an inflatable vehicle occupant restraint such as an air bag.

BACKGROUND OF THE INVENTION

An inflatable vehicle occupant restraint, such as an air bag, is inflated when the vehicle experiences a collision. Inflation fluid is then directed to flow from a source of inflation fluid into the air bag. The inflation fluid increases the internal fluid pressure of the air bag and inflates the air bag to an inflated condition. When the air bag is in the inflated condition, it extends into the vehicle occupant compartment at a location adjacent to an occupant of the vehicle. The internal fluid pressure attained by the inflated air bag is controlled so that the inflated air bag can protect the occupant from a forceful impact with parts of the vehicle as result of the collision.

In certain applications, an air bag is inflated when the vehicle experiences a side impact collision, such as a collision in which an impact is directed against a door at the side of the vehicle. A side impact collision can cause the door to intrude toward the middle of the vehicle. The air bag is inflated into the vehicle occupant compartment at a location between the door and an occupant of a seat adjacent to the door. The air bag is thus inflated into the vehicle occupant compartment so as to protect the occupant from being forcefully struck by the intruding door.

When an air bag is inflated to protect a vehicle occupant in the foregoing manner, the air bag is subjected to the force of the intruding door moving against the air bag and the force of the air bag moving against the occupant. The forces applied to the air bag can cause the internal fluid pressure of the air bag to increase substantially. Therefore, it may be desirable to control the internal fluid pressure of the air bag by venting the inflation fluid outward from the air bag.

SUMMARY OF THE INVENTION

In accordance with the present invention, an inflatable vehicle occupant restraint comprises a first fabric panel, a second fabric panel, and means for defining a seam at which the fabric panels are fastened to each other. The restraint further comprises vent means for interrupting the seam to define a vent opening through which inflation fluid can exit the restraint between the fabric panels.

In a preferred embodiment of the present invention, the restraint has an inflated condition in which the first fabric panel faces outward from the restraint predominantly in a first direction. The second fabric panel then faces outward from the restraint predominantly in a second direction opposite to the first direction. The vent opening directs the inflation fluid to exit the restraint predominantly in a third direction which is perpendicular to the first and second directions. In the preferred embodiment, the panels have generally circular shapes, with the third direction extending radially outward from the panels. The seam extends circumferentially around the panels, and the vent means preferably defines a pair of vent openings which interrupt the seam at diametrically opposed locations.

Additionally, in the preferred embodiment of the present invention, the restraint is supported in a vehicle in a position from which it is inflated into a space between a vehicle seat and an adjacent vehicle door. The restraint is thus supported in a position to protect an occupant of the seat from being forcefully struck by the door if the door intrudes toward the occupant upon the occurrence of a side impact collision. The vent opening directs the inflation fluid to exit the restraint in a direction which is perpendicular to the direction in which the door moves toward the occupant. This helps to prevent the vented flow of inflation fluid from being directed against the occupant and from being blocked or impeded by the seat or the door.

BRIEF DESCRIPTION OF THE DRAWINGS

The foregoing and other features of the present invention will become apparent to those skilled in the art to which the present invention relates from reading the following description with reference to the accompanying drawings, in which.

DESCRIPTION OF A PREFERRED EMBODIMENT

Figure 1:
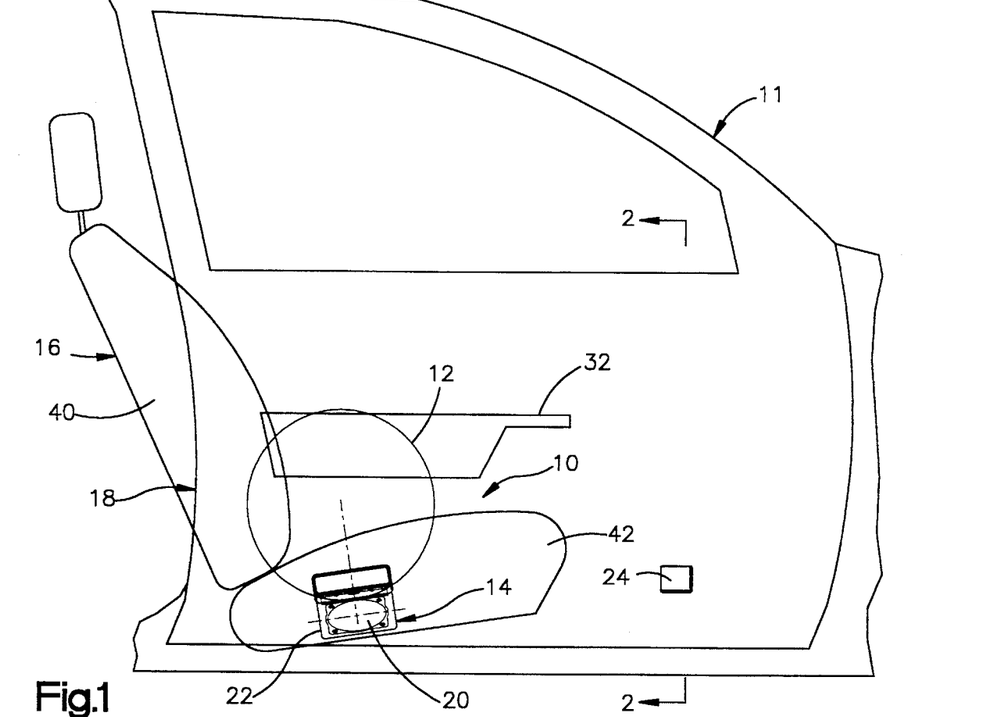
FIG. 1 is a schematic view of a vehicle door at the side of a vehicle, a vehicle seat adjacent to the door, and a vehicle occupant restraint apparatus comprising a first embodiment of the present invention.

A vehicle occupant restraint apparatus 10 comprising a preferred embodiment of the present invention is shown schematically in FIG. 1. The apparatus 10 is mounted in a vehicle 11, and includes an inflatable vehicle occupant restraint 12 which is commonly referred to as an air bag. The air bag 12 is part of an air bag module 14 which is mounted on a vehicle seat 16 adjacent to a door 18 at the side of the vehicle 11. The air bag module 14 includes an inflator 20 and a manifold 22 in addition to the air bag 12.

The apparatus 10 further includes a collision sensor 24. The collision sensor 24 senses a condition which indicates the occurrence of a side impact vehicle collision, such as a collision in which an impact is directed against the door 18. If the collision-indicating condition is above a predetermined threshold, the collision sensor 24 actuates the inflator 20. The inflator 20 then emits a large volume of inflation fluid into the manifold 22. The manifold 22 directs the inflation fluid into the air bag 12 to inflate the air bag 12 from a stored, folded condition to an inflated condition. When the air bag 12 is in the inflated condition, as shown in FIG. 1, it extends between the seat 16 and the door 18 to help protect an occupant of the seat 16 from being forcefully struck by the door 18.

Figure 2:
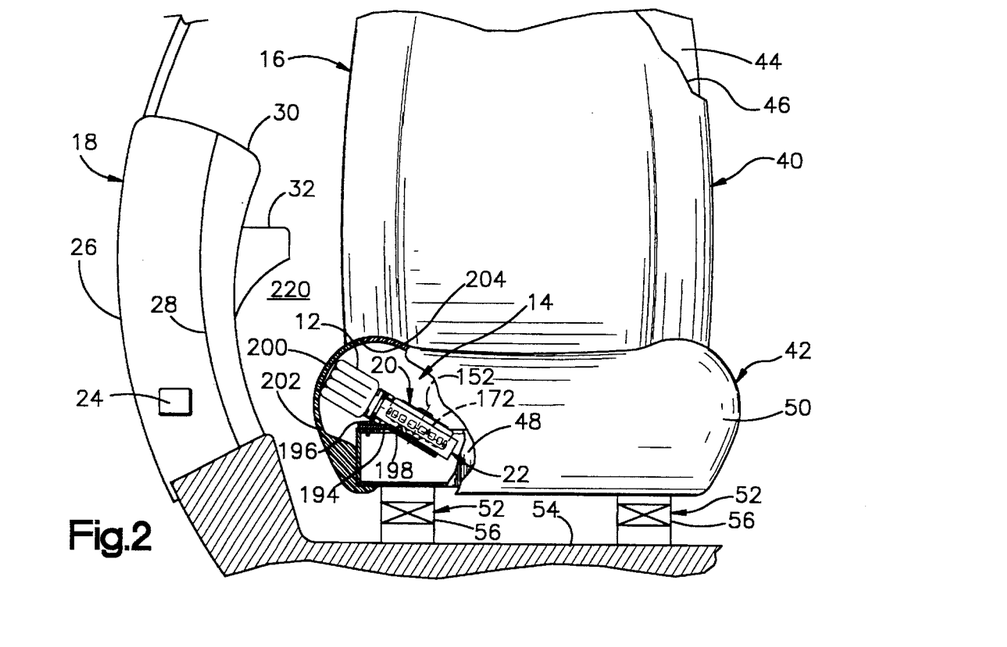
FIG. 2 is a schematic view taken on line 2—2 of FIG. 1.

As shown in FIG. 2, the door 18 has an outer structural panel 26, an inner structural panel 28, and an inner trim panel 30. The inner trim panel 30 covers the inner structural panel 28 and includes an armrest structure 32.

The seat 16 includes a seat back assembly 40 and a seat cushion assembly 42. The seat back assembly 40 includes an upper frame 44 and a pad 46. The pad 46 is supported on the upper frame 44 in a known manner. The seat cushion assembly 42 includes a lower frame 48 and a seat cushion 50. The lower frame 48 supports the seat cushion 50 in a known manner, and also supports the upper frame 44 in a known manner. A pair of track assemblies 52 support the lower frame 48 on the vehicle floor 54. Each track assembly 52 includes a respective bearing assembly 56. The bearing assemblies 56 enable the lower frame 48 to slide along the track assemblies 52 for adjustment of the position of the seat 16. Such track assemblies are known in the art.

Figure 4:
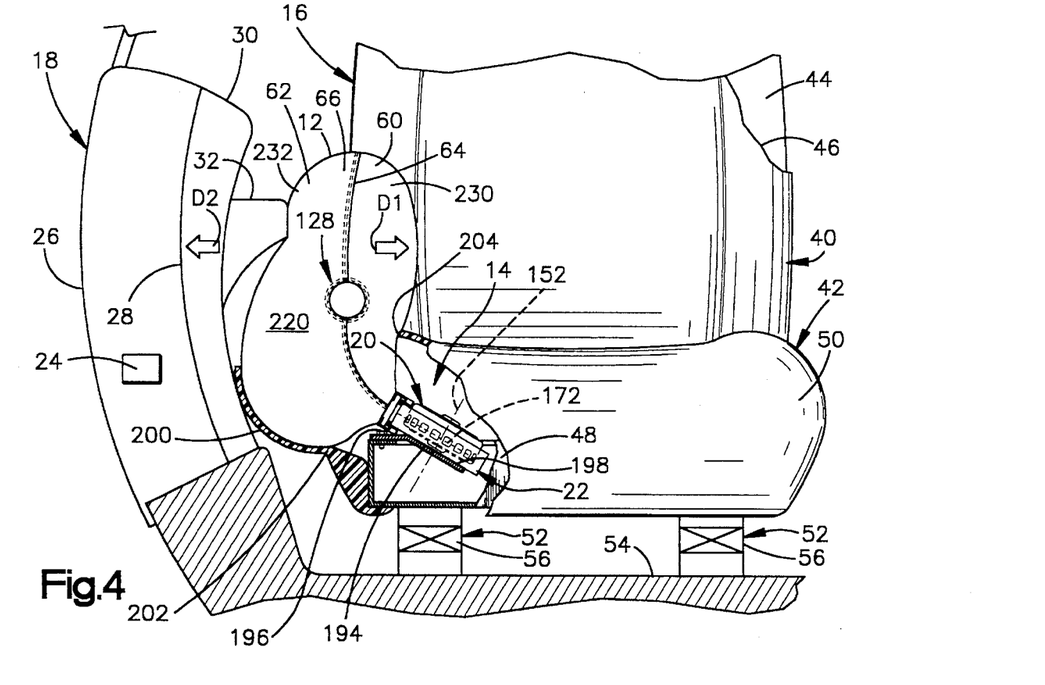
FIG. 4 also is a schematic view similar to FIG. 2 showing parts in different positions.
Figures 5, 13:
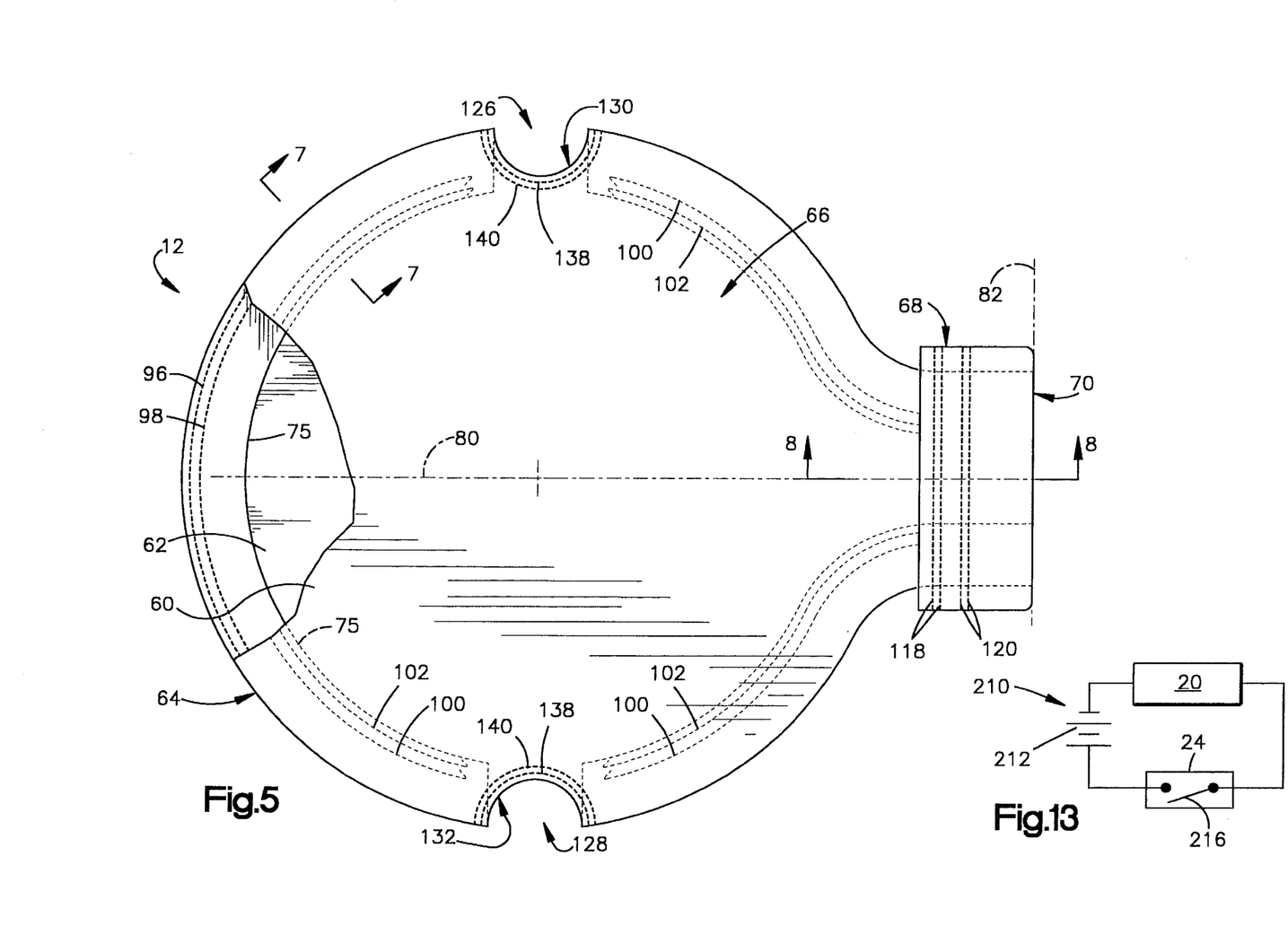
FIG. 5 is a view of an inflatable vehicle occupant restraint shown schematically in FIG. 1.
FIG. 13 is a schematic view of other parts of the apparatus of FIG. 1.

As shown in FIG. 5, the air bag 12 has a first panel 60 and a second panel 62. The first and second panels 60 and 62 are formed of a known fabric, and are fastened to each other at a peripheral seam 64 so as to define a body 66 and a neck 68 of the air bag 12. The body 66 of the air bag 12 has a circular peripheral shape, as viewed in FIG. 5, and has an elliptical cross sectional shape when inflated (FIG. 4). The neck 68 of the air bag 12 has a tubular shape, and has an inlet opening 70 through which inflation fluid is directed into the air bag 12.

Figure 6A:
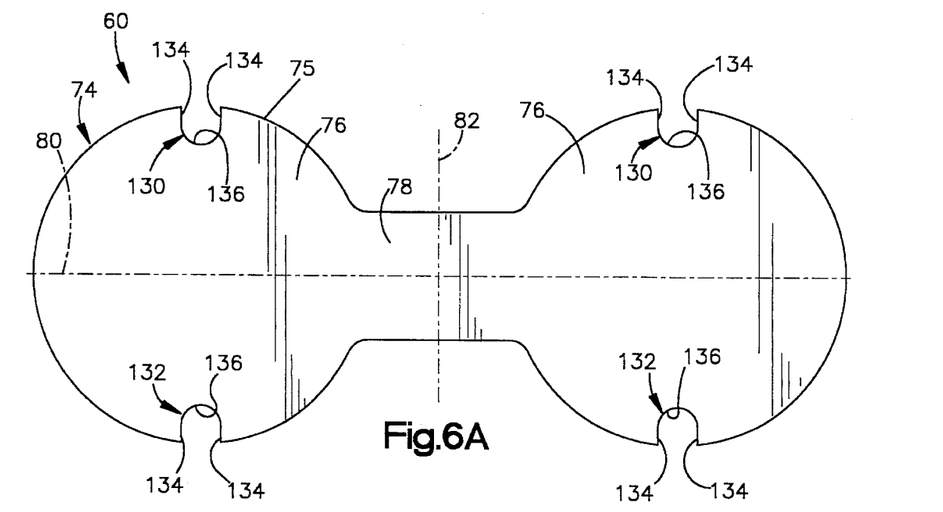
FIG. 6A is a view of a part of the restraint shown in FIG. 5.
Figure 6B:
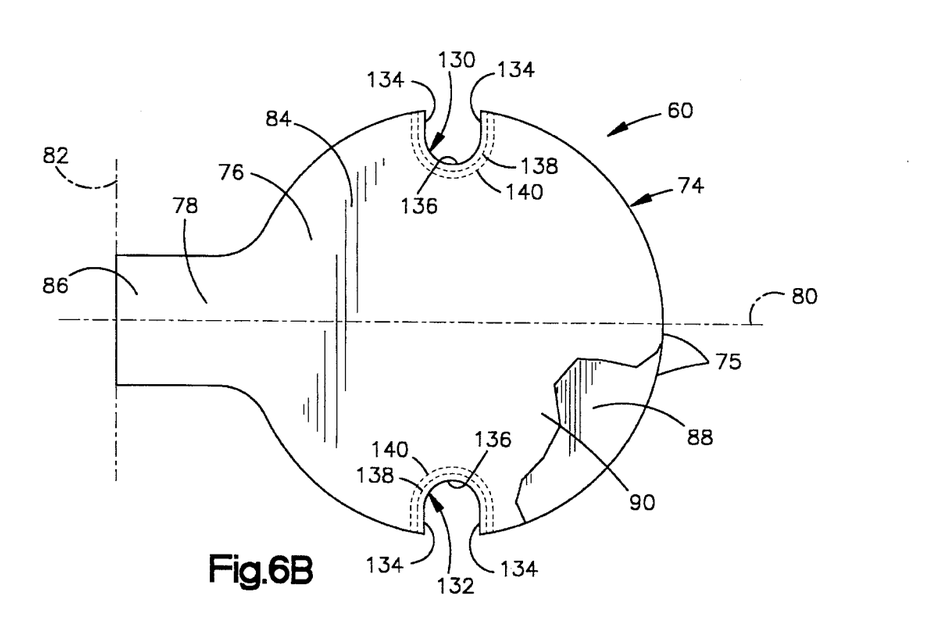
FIG. 6B is a view showing the part of FIG. 6A in a folded condition.

In the preferred embodiment of the present invention shown in the drawings, the first and second air bag panels 60 and 62 are alike, but they could differ from each other. As shown in FIGS. 6A and 6B with reference to the first panel 60, each of the panels 60 and 62 comprises a respective piece 74 of fabric material which is folded into the configuration of the panel 60 (or 62). Each piece 74 of fabric material has a peripheral edge 75, a pair of circular opposite end portions 76, and a rectangular central portion 78 located between the opposite end portions 76. Additionally, each piece 74 of fabric material is symmetrical about longitudinal and transverse centerlines 80 and 82, respectively.

The panel 60 (or 62) is formed by folding the respective piece 74 of fabric material in half about the transverse centerline 82 from the initial, unfolded condition of FIG. 6A to the folded condition of FIG. 6B. The panel 60 then has a circular body portion 84 and a rectangular neck portion 86, each of which comprises two plies 88 and 90 of the fabric material. The two plies 88 and 90 at the body portion 84 of the panel 60 are defined by the overlapping circular end portions 76 of the folded piece 74 of fabric material. The two plies 88 and 90 at the neck portion 86 of the panel 60 are defined by overlapping halves of the rectangular central portion 78 of the folded piece 74 of fabric material.

Figure 6C:
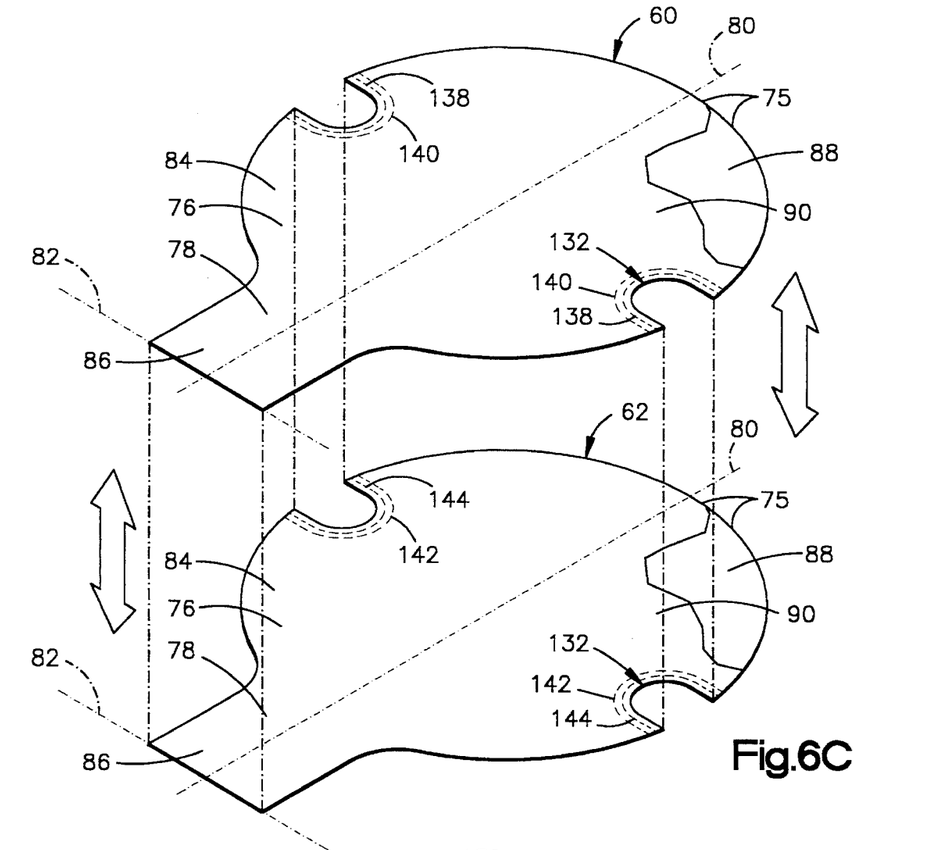
FIG. 6C is an exploded view of parts of the restraint of FIG. 5.
Figure 6D:
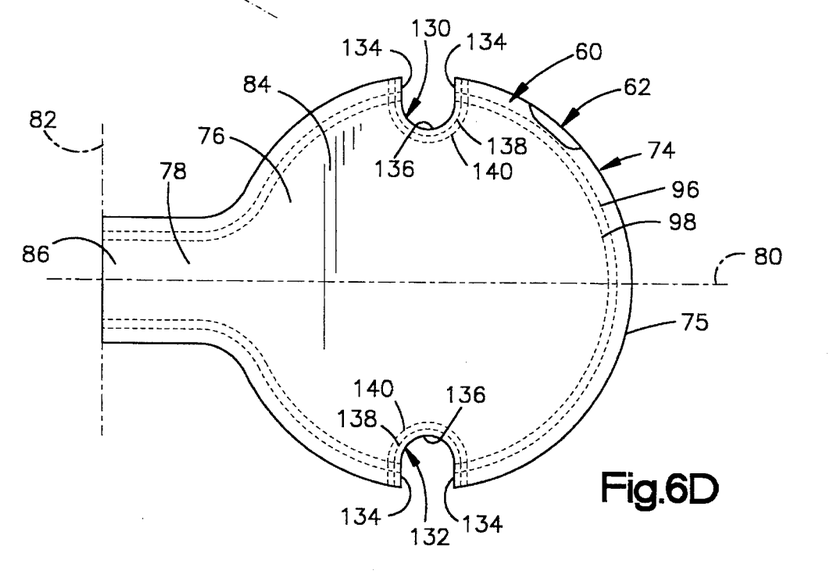
FIG. 6D is a view showing the parts of FIG. 6C in a partially assembled relationship.

When the first and second air bag panels 60 and 62 have both been folded in half as described above with reference to the first panel 60, they are placed together in overlapping contact as indicated in FIGS. 6C and 6D. The two panels 60 and 62 are then fastened to each other. As shown in FIG. 6D, the panels 60 and 62 are preferably fastened to each other by two rows of stitches 96 and 98 which extend around the peripheries of the panels 60 and 62. The stitches of which the rows 96 and 98 are formed may be of any suitable stitch type known in the art, such as a conventional lock stitch, and the stitching thread may be formed of any suitable material known in the art. Moreover, other fastening means, such as adhesives, could also be used.

Figure 7:
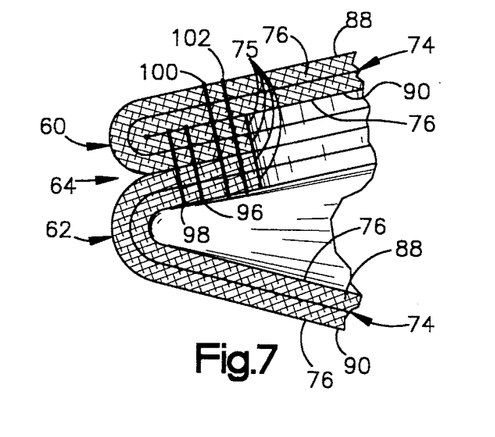
FIG. 7 is a view taken on line 7—7 of FIG. 5.

Next, the fastened panel structure of FIG. 6D is turned inside out. As shown in FIG. 7, the peripheral edges 75 of the fabric pieces 74 are then located inside the air bag 12. The rows 96 and 98 of stitches also are located inside the air bag 12. The air bag 12 is then top stitched to complete the seam 64. Specifically, two rows 100 and 102 of stitches are added at locations spaced inward from the rows 96 and 98, as shown in FIG. 7. The rows 100 and 102 of stitches also may be formed in any suitable manner known in the art.

Figure 8:
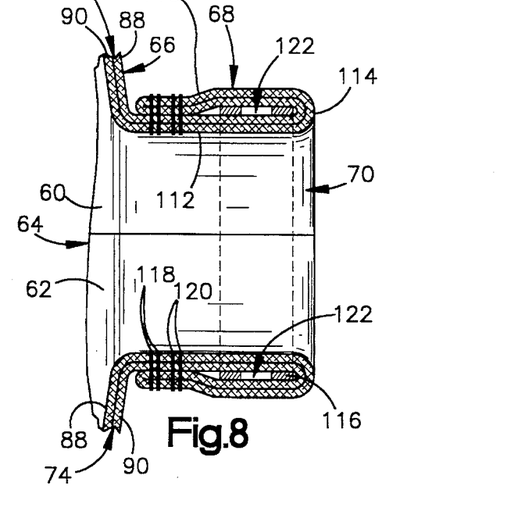
FIG. 8 is a view taken on line 8—8 of FIG. 5.

As shown in detail in FIG. 8, the neck 68 of the air bag 12 has a tubular outer portion 110 which is folded over a contiguous tubular inner portion 112. The neck 68 thus has a folded edge 114 that defines the inlet opening 70. A rectangular retainer ring 116 is received between the inner and outer portions 112 and 110 of the neck 68, and is secured within the neck 68 by double rows 118 and 120 of stitches which fasten the inner and outer portions 112 and 110 of the neck 68 together. Like the rows 96–102 of stitches described above, the double rows 118 and 120 of stitches may be formed in any suitable manner known in the art. A plurality of openings 122 extend through the retainer ring 116.

As thus far described, the air bag 12 is constructed in accordance with the invention set forth in copending U.S. patent application Ser. No. 08/260,097, filed Jun. 15, 1994, entitled Inflatable Occupant Restraint, and assigned to TRW Vehicle Safety Systems Inc. In accordance with the present invention, the air bag 12 further has first and second vent openings 126 and 128 (FIG. 5). The vent openings 126 and 128 are defined by inner edges of the air bag panels 60 and 62. As shown in FIG. 6A with reference to the first panel 60, the piece 74 of fabric material has a pair of first inner edges 130 on one side of the longitudinal centerline 80, and has a pair of second inner edges 132 at diametrically opposed locations on the other side of the longitudinal centerline 80. Each of the inner edges 130 and 132 has a pair of parallel, linear side portions 134 and a semicircular central portion 136. When the piece 74 of fabric material is in the initial, unfolded condition of FIG. 6A, the linear portions 134 of the inner edges 130 and 132 extend outwardly from the semicircular portions 136.

When the air bag panels 60 and 62 are folded in half and fastened to each other to define the fastened panel structure of FIG. 6D, as described above, the first inner edges 130 on the two panels 60 and 62 adjoin each other, and the second inner edges 132 on the two panels 60 and 62 also adjoin each other. When the fastened panel structure of FIG. 6D has been turned inside out as described above, the linear portions 134 of the inner edges 130 and 132 extend inwardly from the semicircular portions 136. As shown in detail in FIGS. 9 and 10, the first vent opening 126 is thus defined in a circular shape by the adjoining semicircular portions 136 of the first inner edges 130 of the two panels 60 and 62. The second vent opening 128 is likewise defined in a circular shape by the second inner edges 132 of the two panels 60 and 62 which adjoin each other on the other side of the longitudinal centerline 80. In accordance with this feature of the present invention, the vent openings 126 and 128 are formed at diametrically opposed locations on the body 66 of the air bag 12. The vent openings 126 and 128 thus interrupt the seam 64, which extends circumferentially about the periphery of the body 66 of the air bag 12, at diametrically opposed locations.

Figure 9:
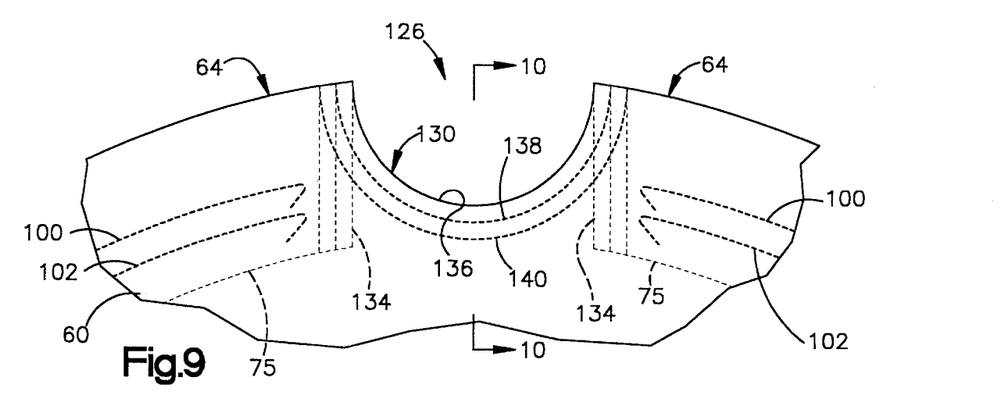
FIG. 9 is an enlarged partial view of the restraint shown in FIG. 5.
Figure 10:
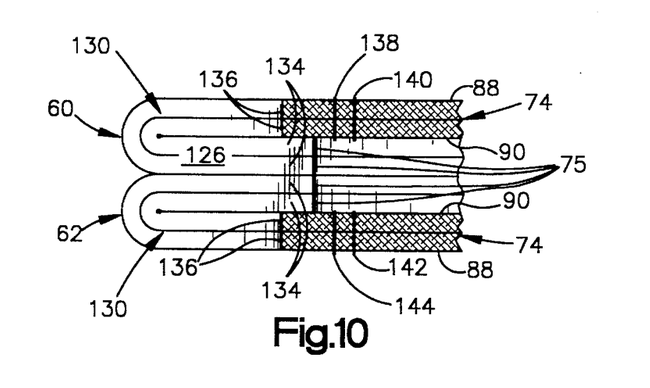
FIG. 10 is a view taken on line 10—10 of FIG. 9.

Additional stitching is used to reinforce the air bag 12 at the locations where the vent openings 126 and 128 interrupt the seam 64. As shown in FIGS. 9 and 10 with reference to the first vent opening 126, the additional stitching preferably comprises at least two rows 138 and 140 of additional stitches in the first panel 60 and at least two rows 142 and 144 of additional stitches in the second panel 62. As shown in FIGS. 6B and 6C, the rows 138, 140, 142 and 144 of additional stitches are preferably formed in the panels 60 and 62 before the panels 60 and 62 are fastened to each other by the rows 96–102 of stitches at the seam 64. The rows 138 and 140 of additional stitches in the first panel 60 thus fasten the overlapping plies 88 and 90 of the respective fabric piece 74 to each other along the lengths of the semicircular portions 136 of the first inner edges 130. The rows 142 and 144 of additional stitches in the second panel 62 likewise fasten the overlapping plies 88 and 90 of the respective fabric piece 74 to each other along the lengths of the semicircular portions 136 of the first inner edges 130. The air bag 12 is further reinforced by additional stitching at the location of the second vent opening 128 in the same manner. Moreover, the rows 96–102 of stitches at the seam 64 turn back from the vent openings 126 and 128, as shown in FIG. 9, for additional reinforcement of the air bag 12 at the vent openings 126 and 128.

Figure 11:
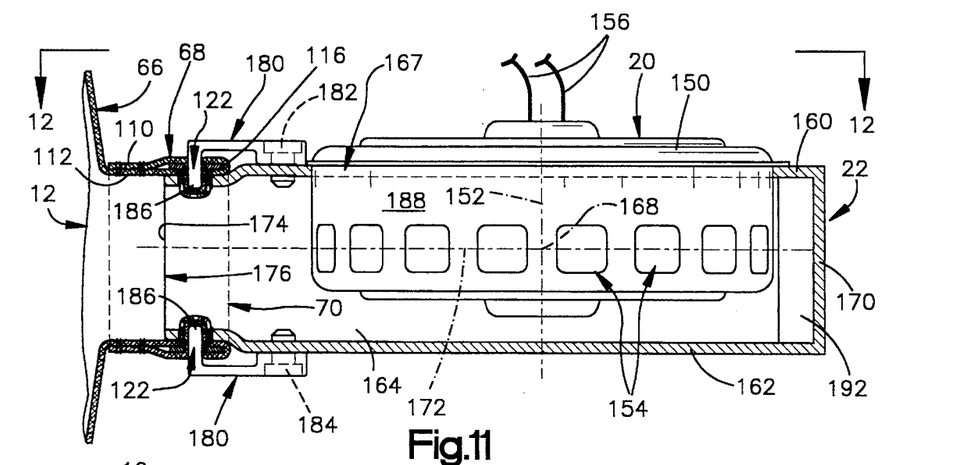
FIG. 11 is a view showing other parts of the apparatus of FIG. 1.
Figure 12:
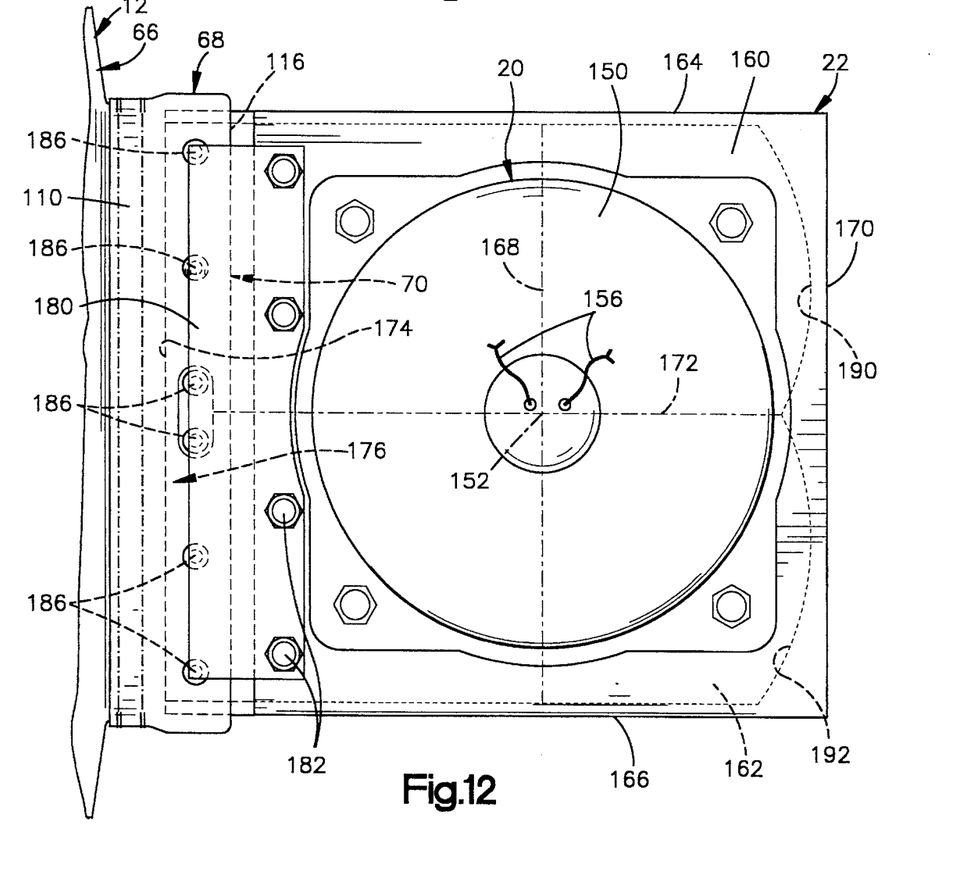
FIG. 12 is a view taken on line 12—12 of FIG. 11.

As shown in FIGS. 11 and 12, the inflator 20 has a short, cylindrical housing 150 with a central axis 152. The housing 150 has a plurality of gas outlet openings 154 in an array extending circumferentially around the axis 152. An ignitable gas generating material (not shown) is contained in the housing 150 and, when ignited, generates a large volume of gas for inflating the air bag 12. The gas generating material may have any suitable composition known in the art, and is ignited upon the passage of electric current between a pair of lead wires 156. Although the preferred embodiment of the present invention shown in the drawings uses such an inflator to provide gas for inflating the air bag 12, any other known sources of inflation fluid, such as a container of gas stored under pressure or a combination of stored gas and ignitable gas generating material, could be used as alternatives.

The manifold 22 is a box-like structure with a top wall 160, a bottom wall 162, and a pair of opposite side walls 164 and 166. The inflator housing 150 is received closely through a circular opening 167 in the top wall 160 of the manifold 22, and is spaced from the bottom wall 162, as shown in FIG. 11. The gas outlet openings 154 in the inflator housing 150 are thus located within the manifold 22.

The opposite side walls 164 and 166 of the manifold 22 close the sides of the manifold 22, and are spaced from the inflator housing 150 along a first manifold axis 168 that is perpendicular to the central axis 152 and the side walls 164 and 166. An end wall 170 of the manifold 22 is spaced from the inflator housing 150 along a second manifold axis 172 which is perpendicular to both the central axis 152 and the first manifold axis 168. The end wall 170 extends between the side walls 164 and 166, and thus closes one end of the manifold 22. An edge surface 174 of the manifold 22 defines a rectangular gas exit opening 176 at the other end of the manifold 22. The gas exit opening 176 is centered on the second manifold axis 172, and is spaced from the inflator housing 150 along the second manifold axis 172.

The air bag 12 is connected to the manifold 22 by a pair of clamping strips 180. One of the clamping strips 180 is fixed to the top wall 160 of the manifold 22 by fasteners 182, and the other clamping strip 180 is fixed to the bottom wall 162 of the manifold 22 by fasteners 184. Each of the clamping strips 180 has plurality of clamping fingers 186. The clamping fingers 186 on each clamping strip 180 project toward, and are aligned with, the clamping fingers 186 on the other clamping strip 180. Each of the clamping fingers 186 extends through a respective one of the openings 122 in the retainer ring 116. The tubular portions 110 and 112 of the neck 68 of the air bag 12 are sized so that parts of the tubular portions 110 and 112 can be drawn inwardly through the openings 122 by the clamping fingers 186, as shown in FIG. 11. The clamping strips 180 thus connect the neck 68 of the air bag 12 to the manifold 22, with the inlet opening 70 in the air bag 12 being aligned with the gas exit opening 176 in the manifold 22.

As thus far described, the manifold 22 defines a gas flow space 188 which communicates the gas outlet openings 154 in the inflator housing 150 with the gas exit opening 176 in the manifold 22. When the inflator 20 is actuated, the gas generated by the gas generating material is emitted radially outward from the housing 150 throughout the entire circumferential array of gas outlet openings 154. The gas thus flows into the gas flow space 188 in a direction toward the gas exit opening 176, and also in directions toward the side walls 164 and 166 and the end wall 170. Since the manifold 22 is open only at the gas exit opening 176, the manifold 22 directs the gas that is emitted from all of the gas outlet openings 154 to flow through the gas exit opening 176 and into the air bag 12 to inflate the air bag 12.

As an optional feature, the manifold 22 in the preferred embodiment of the present invention is designed to direct the gas to develop a flow which turns from the end wall 170 toward the gas exit opening 176. Specifically, the end wall 170 of the manifold 22 has a pair of curved inner wall surfaces 190 and 192 which partially define the gas flow space 188 within the manifold 22. Each of the curved inner wall surfaces 190 and 192 faces toward the gas exit opening 176 at the other end of the manifold 22, and is concave relative to the gas exit opening 176. When the gas is emitted from the inflator housing 150 as described above, some of the gas flows toward and against the end wall 170 in a direction extending at least partially from the left to the right along the axis 172, as viewed in FIG. 12. As the pressure of the gas forces the gas to flow along the end wall 170 between the side walls 164 and 166, the curved inner wall surfaces 190 and 192 direct the gas to turn in a direction extending at least partially to the left along the axis 172. The curved inner wall surfaces 190 and 192 thus direct the gas to develop a flow which turns from the end wall 170 toward the gas exit opening 176.

Figure 3:
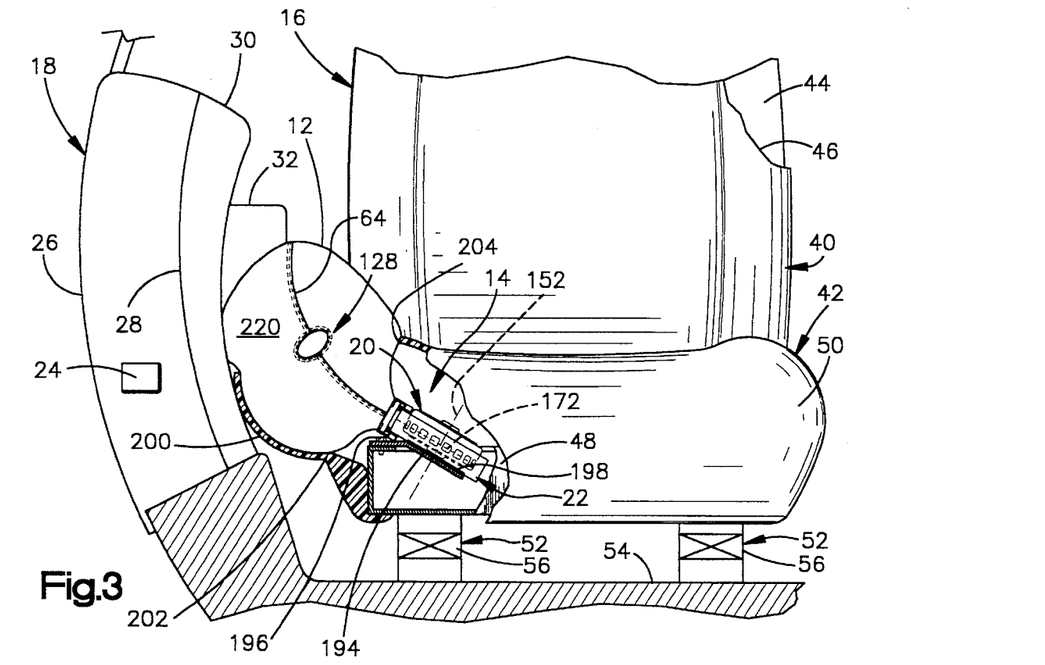
FIG. 3 is a schematic view similar to FIG. 2 showing parts in different positions.

The air bag module 14, as shown in FIGS. 2–4, is supported on the lower frame 48 in the seat cushion assembly 42 by a bracket 194. The bracket 194 is fixed to the lower frame 48 by fasteners 196, and is fixed to the air bag module 14 by a weld 198 between the bracket 194 and the manifold 22. As another optional feature, the bracket 194 supports the air bag module 14 in a position in which the second manifold axis 172 is inclined upwardly at an angle from a horizontal line. In the preferred embodiment of the present invention shown in the drawings, that angle is approximately 30°, but could vary. Accordingly, the manifold 22 directs the gas from the inflator 20 to flow into the air bag 12 predominantly in a direction which is inclined upwardly at an angle of approximately 30° from a horizontal direction.

As further shown in FIG. 2, the air bag 12 is located adjacent to a deployment door portion 200 of the seat cushion 50 when the air bag 12 is in the stored, folded condition. A hinge portion 202 of the seat cushion 50 extends horizontally in a direction lengthwise relative to the vehicle 11, and defines the lower edge of the deployment door portion 200. A stress riser portion 204 of the seat cushion 50 extends around, and defines the periphery of, the deployment door portion 200 between the opposite ends of the hinge portion 202.

The vehicle occupant restraint apparatus 10 further includes an electrical circuit 210. As shown schematically in FIG. 13, the electrical circuit 210 includes a power source 212 which is preferably the vehicle battery and/or a capacitor. The electrical circuit 210 also includes the inflator 20 and a normally open switch 216. The switch 216 is part of the collision sensor 24 (FIG. 1). The collision sensor 24 senses a vehicle condition which indicates the occurrence of a collision for which inflation of the air bag 12 is desired to protect an occupant of the seat 16. As described briefly above, the air bag 12 is inflated to restrain an occupant of the seat 16 upon the occurrence of a side impact collision, i.e., a collision in which an impact is directed against the vehicle 11 in a direction transverse to the front-to-rear axis of the vehicle 11. Therefore, the collision-indicating condition that is sensed by the collision sensor 24 may comprise, for example, a predetermined amount of transverse vehicle acceleration and/or a predetermined amount of crushing of the door 18 or another side portion of the vehicle 11. When the switch 216 is closed, electric current is directed through the inflator 20 between the lead wires 156 (FIG. 11) to actuate the inflator 20 electrically.

When the inflator 20 is actuated, the gas emitted from the inflator 20 is directed into the air bag 12 by the manifold 22. As the gas begins to inflate and increase the internal fluid pressure of the air bag 12, it moves the air bag 12 forcefully against the deployment door portion 200 of the seat cushion 50 (FIG. 2). The stress riser portion 204 of the seat cushion 50 ruptures under the stress induced by the internal fluid pressure of the air bag 12. The stress riser portion 204 thus releases the deployment door portion 200 to be moved pivotally about the hinge portion 202 from a closed position (FIG. 2) to an open position (FIG. 3) under the influence of the air bag 12 as the air bag 12 inflates outwardly from the seat cushion 50.

The gas flowing into the air bag 12 inflates the air bag 12 outwardly from the seat cushion 50 toward the inflated condition shown in FIG. 4. However, the air bag module 14 is preferably supported on the seat 16 so as to direct the air bag 12 to move into, and partially through, a space 220 between the seat 16 and the door 18. The volume of the space 220 is less than the inflated volume reached by the air bag 12 when the air bag 12 is in the inflated condition of FIG. 4. Therefore, the air bag 12 moves forcefully into contact with the door 18 at the inner trim panel 30, as shown in FIG. 3, as the air bag 12 is being inflated toward the inflated condition of FIG. 4.

When the air bag 12 moves forcefully against the door 18 as shown in FIG. 3, the door 18 offers resistance to further inflation of the air bag 12. The combined resistance offered by the seat 16 and the door 18 constrains the air bag 12 between the seat 16 and the door 18. The air bag 12 is thus constrained to reach a constrained volume which is less than the inflated volume it would reach at the same time if it were inflating freely without being constrained. As a result of the lesser volume, the internal fluid pressure of the air bag 12 increases at a rate which is greater than the rate at which it would increase if the air bag 12 were inflating freely to a greater, unconstrained volume. The internal fluid pressure of the air bag 12 is thus increased at a greater rate so that the air bag 12 more quickly reaches elevated internal fluid pressure levels.

As described above, the air bag module 14 is preferably supported on the seat 16 at an inclined angle of approximately 30°. The air bag module 14 thus directs the air bag 12 to emerge initially from the seat 16 at a location which will adjoin only the lower, pelvic region of a seated occupant's anatomy, rather than both the pelvic region and the upper, abdominal region. Moreover, if the vehicle collision causes the door 18 to move forcefully against the seat 16 so as to pivot the air bag module 14 upwardly, i.e., in a clockwise direction as viewed in FIGS. 2–4, the low initial position of the inflating air bag 12 will enable the air bag 12 to remain adjacent to the pelvic region of the occupant's anatomy.

A side impact collision can cause the door 18 to intrude into the vehicle occupant compartment in a direction toward the seat 16, i.e., in a first direction D1 as indicated in FIG. 4. When the air bag 12 is inflated in the foregoing manner, it helps to protect an occupant of the seat 16 from being forcefully struck by the door 18 upon such inward movement of the door 18. As shown specifically in FIG. 4, the body 66 of the air bag 12 has first and second major outer side surfaces 230 and 232 which are defined by the first and second air bag panels 60 and 62, respectively. When the air bag 12 is in the inflated condition of FIG. 4, the first major outer side surface 230 faces predominantly toward the seat 16 in the first direction D1, and the second major outer side surface 232 faces predominantly toward the door 18 in a second, opposite direction D2. The inflated air bag 12 is thus interposed between the door 18 and an occupant of the seat 16 to protect the occupant from being forcefully struck by the door 18 upon intrusion of the door 18 in the first direction D1.

However, the inflated air bag 12 is then subjected to the force of the door 18 acting against the second air bag panel 62, and also to the force of the occupant acting against the first air bag panel 60. As a result of such forces applied to the air bag 12, the internal fluid pressure of the inflated air bag 12 is increased substantially. This increase in internal fluid pressure follows the increase in internal fluid pressure which results from the initial movement of the air bag 12 into the confined space 220, as described above.

In accordance with the present invention, the vent openings 126 and 128 direct some of the inflation fluid to exit the air bag 12 so that the internal fluid pressure of the air bag 12 does not reach an excessively elevated level. In accordance with this feature of the present invention, the vent openings 126 and 128 direct the inflation fluid to exit the air bag in directions extending radially outward from the body 66 of the air bag 12, i.e., in directions that are predominantly perpendicular to the directions D1 and D2 indicated in FIG. 4. The flows of inflation fluid that are directed outward from the air bag 12 through the vent openings 126 and 128 are thus directed away from the occupant and are not blocked or impeded substantially by the seat 16 or the door 18.

From the above description of the invention, those skilled in the art will perceive improvements, changes and modifications. For example, although the invention has been described with reference to an air bag that is inflated between a vehicle seat cushion assembly and an adjacent vehicle door, the invention could also be used with an air bag that is inflated between a different part of a vehicle seat and an adjacent door, or between a vehicle seat and another side portion of the vehicle, such as a fixed side panel of the vehicle. The invention could also be used with air bags or other inflatable vehicle occupant restraints that are inflated at other locations in a vehicle, such as at the front of a vehicle. Additionally, the shapes, the sizes, and the number of the vent openings provided in an inflatable vehicle occupant restraint in accordance with the present invention could differ from those described above. Such improvements, changes and modifications within the skill of the art are intended to be covered by the appended claims.

Having described the invention, the following is claimed:

1. Apparatus comprising:

an inflatable vehicle occupant restraint comprising a first fabric panel, a second fabric panel, and means for defining a seam at which said fabric panels are fastened to each other;

said restraint further comprising vent means for interrupting said seam to define a vent opening through which inflation fluid can exit said restraint between said fabric panels;

said vent opening being circular, said vent means comprising a semicircular edge portion of said first fabric panel which defines a first half of said vent opening and a semicircular edge portion of said second fabric panel which defines a second half of said vent opening.

2. Apparatus as defined in claim 1 wherein said first and second fabric panels comprise first and second pieces of fabric material, respectively, said semicircular edge portion of said first fabric panel comprising adjoining semicircular edge portions of overlapping plies of said first piece of fabric material, said semicircular edge portion of said second fabric panel comprising adjoining semicircular edge portions of overlapping plies of said second piece of fabric material.

3. Apparatus as defined in claim 1 wherein said restraint further comprises means for defining an inflation fluid inlet opening, said first and second fabric panels having major portions with generally circular shapes, said seam extending circumferentially around said major portions of said panels, said vent means being one of a pair of vent means which are alike and which interrupt said seam at a corresponding pair of diametrically opposed locations which are substantially equidistant from said inlet opening, said vent opening being one of a pair of vent openings which are alike and which direct said inflation fluid to exit said restraint at said diametrically opposed locations.

4. Apparatus comprising:

an inflatable vehicle occupant restraint comprising a first fabric panel, a second fabric panel, and means for defining a seam at which said fabric panels are fastened to each other;

a source of inflation fluid;

directing means for directing inflation fluid from said source into said restraint to inflate said restraint; and supporting means for supporting said restraint in a vehicle in a position from which said restraint moves into a space between a vehicle seat and a side portion of the vehicle when said restraint is inflating, said supporting means thus directing said restraint to restrain movement of a vehicle occupant relative to the side portion of the vehicle in a direction extending from the vehicle seat toward the side portion of the vehicle;

said restraint further comprising vent means for interrupting said seam to define a vent opening through which said inflation fluid can exit said restraint between said panels;

said vent opening being circular, said vent means comprising a semicircular edge portion of said first fabric panel which defines a first half of said vent opening and a semicircular edge portion of said second fabric panel which defines a second half of said vent opening.

5. Apparatus as defined in claim 4 wherein said first and second fabric panels comprise first and second pieces of fabric material, respectively, said semicircular edge portion of said first fabric panel comprising adjoining semicircular edge portions of overlapping plies of said first piece of fabric material, said semicircular edge portion of said second fabric panel comprising adjoining semicircular edge portions of overlapping plies of said second piece of fabric material.

6. Apparatus as defined in claim 5 wherein said restraint further comprises means for defining an inflation fluid inlet opening, said first and second fabric panels having major portions with generally circular shapes, said seam extending circumferentially around said major portions of said panels, said vent means being one of a pair of vent means which are alike and which interrupt said seam at a corresponding pair of diametrically opposed locations which are substantially equidistant from said inlet opening, said vent opening being one of a pair of vent openings which are alike and which direct said inflation fluid to exit said restraint at said diametrically opposed locations.

7. Apparatus comprising:

an inflatable vehicle occupant restraint comprising a first fabric panel, a second fabric panel, and means for defining a seam between said fabric panels, said means for defining a seam comprising stitch means for attaching said fabric panels to each other along said seam;

said restraint further comprising vent means for defining a vent opening through which inflation fluid can exit said restraint between said fabric panels continuously throughout inflation of said restraint from a folded, uninflated condition to an unfolded, inflated condition;

said vent means interrupting said seam such that said stitch means is discontinuous across said vent opening and said fabric panels are detached from each other at said vent opening prior to inflation of said restraint.

8. Apparatus comprising:

an inflatable vehicle occupant restraint comprising a first fabric panel, a second fabric panel, and means for defining a seam between said fabric panels, said means for defining a seam comprising stitch means for attaching said fabric panels to each other along said seam;

said restraint further comprising vent means for defining a vent opening through which inflation fluid can exit said restraint between said fabric panels continuously throughout inflation of said restraint from a folded, uninflated condition to an unfolded, inflated condition;

said vent means interrupting said seam such that said stitch means is discontinuous across said vent opening and said fabric panels are detached from each other at said vent opening prior to inflation of said restraint;

said restraint further comprising means for defining an inflation fluid inlet opening, said first and second fabric panels having major portions with generally circular shapes, said seam extending circumferentially around said major portions of said panels, said vent means being one of a pair of vent means which are alike and which interrupt said seam at a corresponding pair of diametrically opposed locations which are substantially equidistant from said inlet opening, said vent opening being one of a pair of vent openings which are alike and which direct said inflation fluid to exit said restraint at said diametrically opposed locations.

9. Apparatus comprising:

an inflatable vehicle occupant restraint comprising a first fabric panel, a second fabric panel, and means for defining a seam between said fabric panels, said means for defining a seam comprising stitch means for attaching said fabric panels to each other along said seam;

said restraint further comprising vent means for defining a vent opening through which inflation fluid can exit said restraint between said fabric panels continuously throughout inflation of said restraint from a folded, uninflated condition to an unfolded, inflated condition;

said vent means interrupting said seam such that said stitch means is discontinuous across said vent opening and said fabric panels are detached from each other at said vent opening prior to inflation of said restraint;

said vent opening being circular, said vent means comprising a semicircular edge portion of said first fabric panel which defines a first half of said vent opening and a semicircular edge portion of said second fabric panel which defines a second half of said vent opening.

10. Apparatus as defined in claim 9 wherein said first and second fabric panels comprise first and second pieces of fabric material, respectively, said semicircular edge portion of said first fabric panel comprising adjoining semicircular edge portions of overlapping plies of said first piece of fabric material, said semicircular edge portion of said second fabric panel comprising adjoining semicircular edge portions of overlapping plies of said second piece of fabric material.

* * * * *